(12) United States Patent
Dufournier et al.

(10) Patent No.: US 7,234,496 B2
(45) Date of Patent: Jun. 26, 2007

(54) SAFETY INSERT GENERATING A TRANSVERSE VIBRATING SIGNAL AND DEVICE FOR SENSING THE TIRE BEARING ON THE INSERT

(75) Inventors: Arnaud Dufournier, Clermont-Ferrand (FR); Francois Hottebart, Royat (FR)

(73) Assignee: Compagnie Générale des Etablissements Michelin-Michelin & Cie, Clermont-Ferrand (FR)

( * ) Notice: Subject to any disclaimer, the term of this patent is extended or adjusted under 35 U.S.C. 154(b) by 450 days.

(21) Appl. No.: 10/777,584

(22) Filed: Feb. 12, 2004

(65) Prior Publication Data

US 2004/0159384 A1    Aug. 19, 2004

Related U.S. Application Data

(60) Division of application No. 10/023,185, filed on Dec. 18, 2001, now abandoned, which is a division of application No. 09/418,283, filed on Oct. 14, 1999, now Pat. No. 6,397,670, which is a continuation of application No. PCT/EP98/02251, filed on Apr. 17, 1998.

(30) Foreign Application Priority Data

| Apr. 18, 1997 | (FR) | 97 05243 |
|---|---|---|
| Jan. 30, 1998 | (FR) | 98 01385 |
| Mar. 3, 1998 | (FR) | 98 02809 |

(51) Int. Cl.
B60C 17/04    (2006.01)

(52) U.S. Cl. .................. 152/158; 152/520

(58) Field of Classification Search ........... 152/158, 152/520

See application file for complete search history.

(56) References Cited

U.S. PATENT DOCUMENTS

| 4,117,452 | A |   | 9/1978 | Snyder et al. |
|---|---|---|---|---|
| 4,262,724 | A |   | 4/1981 | Sarkissian |
| 4,318,435 | A | * | 3/1982 | Heath-Coleman ........... 152/158 |
| 4,742,712 | A |   | 5/1988 | Kokubo |
| 5,626,696 | A | * | 5/1997 | Boni et al. .................. 152/520 |
| 5,749,982 | A |   | 5/1998 | Muhlhoff et al. |
| 6,094,978 | A |   | 8/2000 | Battocchio et al. |
| 6,543,500 | B1 |   | 4/2003 | Dufournier |

FOREIGN PATENT DOCUMENTS

| DE | 3617381 | 11/1987 |
|---|---|---|
| EP | 363639 | 9/1989 |
| EP | 421065 | 7/1990 |
| EP | 836957 | 4/1998 |
| FR | 2579142 | 9/1986 |
| FR | 2664535 | 1/1992 |
| GB | 546975 | 8/1942 |

\* cited by examiner

*Primary Examiner*—Adrienne C. Johnstone
(74) *Attorney, Agent, or Firm*—Fitzpatrick, Cella, Harper & Scinto

(57) ABSTRACT

A safety insert designed to be mounted in an assembly comprising a tire and a rim of a vehicle and device for detecting the bearing of the tire on an insert, so that the insert generates signals oriented parallel to the axis of rotation of the tire and rim assembly and so that the device detects and analyzes the vibrating signals of the chassis of the vehicle.

13 Claims, 7 Drawing Sheets

US 7,234,496 B2

SAFETY INSERT GENERATING A TRANSVERSE VIBRATING SIGNAL AND DEVICE FOR SENSING THE TIRE BEARING ON THE INSERT

CROSS-REFERENCE TO RELATED APPLICATION

This application is a division of Application No. 10/023,185, filed Dec. 18, 2001, now abandoned which is a division of Application No. 09/418,283, filed Oct. 14, 1999, now U.S. Pat. No. 6,397,670, which is a continuation of PCT/EP98/02251, filed Apr. 17, 1998.

BACKGROUND OF THE INVENTION

The invention concerns the use of tires equipped with a safety insert and, in particular, detection of the bearing of a tire on the safety insert. It proposes an insert which warns the driver as soon as the tire is bearing on it after a flat or in case of substantial pressure loss, as well as a device for sensing the tire bearing on the insert, which can be combined with the insert proposed.

The function of these safety inserts, which are generally mounted on the rim inside the tire, is to bear the load in case of failure of the tire.

Bearing of the tire on the safety insert is accompanied by a more or less marked deterioration of its performances, which can fail to be perceptible to the driver through the behavior of the vehicle and the discomfort of the passenger. Furthermore, the operating lifetime of these inserts is limited. It is therefore essential, for the driver's safety, for the driver to be warned as soon as a tire is bearing on its safety insert, so that the driver can follow the manufacturer's instructions.

Several safety inserts incorporating means for so warning the driver have previously been proposed.

U.S. Pat. No. 4,262,724 discloses a safety insert intended to be mounted in an assembly comprising a tire and a rim and radially on the outside of the rim. This insert has a radially outer surface which defines a radial bearing for the crown of the tire, when the tire is deflated, as well as means for generating vibrating warning signals on running flat. These means can be a variation of the rolling radius under bearing of the insert between a minimum radius and a maximum radius in order to create a rolling vibration or one or more bumps. All the vibrating warning signals generated by these means are oriented in the plane of the tire and rim assembly and, more specifically, in a roughly vertical direction.

These solutions pose several problems. In addition to marked discomfort for passengers of the vehicle, they can markedly degrade the performance of the tire and rim assembly concerned, particularly on acceleration and braking. Thus, all one can do is avoid instantaneous stoppage of the vehicle in case of failure of the tire. On the other hand, when it is desired to use the vehicle, even at limited speed, over long distances, the warning transmitted by the insert has to be compatible with driving safety, not detrimental to the mechanics, while remaining perfectly noticeable to the driver either directly or through a suitable detection device.

Patent application WO 94/03338 also proposes a device for the detection of the bearing of a tire on a safety insert. This device comprises a wheel accelerometer, placed on one of the wheel suspension elements and measuring vertical accelerations. The accelerometers are connected to a central processing unit. The analysis is based on detection of the appearance of a resonance mode characteristic of the run-flat condition.

SUMMARY OF THE INVENTION

The object of the invention is a safety insert which warns the driver, either directly or indirectly, upon bearing of the tire over a very wide range of speeds of the vehicle, while remaining tolerable to the driver and the mechanics within the speed limits.

The invention also concerns a device for detection of the bearing of a tire on its safety insert, which can, notably, cooperate with the safety insert according to the invention.

"Vehicle" is understood below to be a self-contained rolling unit, passenger car, truck, tractor-trailer, motorcycle, etc.

"Rib" refers to an element situated on the radially outer surface of a safety insert, of elongated shape, of roughly circumferential orientation and the radial height of which is less than or equal to the axial width: the ribs are "straight" when their axial section is rectangular and "inclined" when their axial section is in the shape of a parallelogram.

"Incision" describes a similar element whose radial height is greater than the axial width.

The safety insert according to the invention, intended to be mounted in an assembly comprising a tire and a rim of a vehicle and radially on the outside of the rim, presents a radially outer surface which defines a radial bearing for the crown of the tire when it is deflated and means for generating vibrating warning signals on a run-flat condition. The said insert is characterized in that said means generate signals oriented parallel to the axis of rotation of the tire and rim assembly.

Said insert has two major advantages: the vibrating signals generated in the transverse direction are much more easily transmitted to the chassis and to the driver than similar vertically oriented signals. This is due to the excellent filtering carried out by the vehicle suspensions in the vertical direction in order to preserve the comfort of the passengers of the vehicle, while any transmission of stresses in the transverse direction is almost direct, with few filtering elements. On the other hand, those transverse vibrating signals degrade the performance of the tire and rim assembly in a straight line markedly less than those vertically oriented.

In a first embodiment of the invention, the bearing surface of the insert presents a variation of transverse direction according to its azimuth.

In a second embodiment, the bearing surface of the insert presents straight ribs, the circumferential orientation of which varies with their azimuth.

And in a third embodiment, the bearing surface of the insert presents elements generating a transverse stress on their radial compression.

This embodiment is particularly flexible. It is, in fact, possible to use inclined ribs or incisions relative to a longitudinal plane in variable manner according to their azimuth.

In a preferred variant, the safety insert according to the invention has a bearing surface with at least two axially adjacent zones, the zone intended to be placed outward from the vehicle not containing means for generating signals oriented parallel to the axis of rotation of the tire and rim assembly.

The latter solution has the advantage of preserving excellent turn performance of the tire and rim assembly upon running on a safety insert. In fact, on a turn, the tires placed outward from the turn are more loaded and usually take a marked counter-camber angle. Under such conditions, it is the "inactive" bearing zone (that is, not containing means for generating signals oriented parallel to the axis of rotation of the tire and rim assembly) which supports the bulk of the tire load without generating specific transverse vibrating signals. On the other hand, on a straight run, the tires have a much smaller camber angle and, the bearing zone containing means for generating transverse vibrating signals, the "active" zone is then stressed.

The shape of the signal generated by the safety insert is also very important. The safety insert according to the invention preferably comprises a bearing surface with an active signal-generating zone, so that said signals present a maximum preceded and followed by a minimum in the opposite direction.

The active zone advantageously ranges between ¼ and ½ the circumference of said insert and the absolute value of the minima of the signal generated ranges between ¼ and ¾ the absolute value of the maximum.

Such generated signals have the advantage of giving a spectrum of vibrations transmitted to the chassis of the vehicle on a run-flat condition in a well defined frequency band which favors precise and reliable detection.

The invention also concerns a first device for detection of the bearing of a tire of a vehicle, equipped with a plurality of tire, rim and safety insert assemblies mounted between the rim and the radially inner face of the tire tread, on the corresponding safety insert, each assembly being capable of triggering the emission of a vibrating signal, when the tire comes in contact with the insert after a pressure loss in the tire. Said detection device comprises means of detection and treatment of said vibrating signal, containing a single sensor capable of being mounted on the vehicle and sensitive to the signals emitted by each of the assemblies, when the corresponding tire comes in contact with the respective insert, and an indicator capable of signaling to the occupant of the vehicle a run-flat condition in response to a signal picked up by said sensor.

The characteristic vibrating signal is preferably maintained by the run-flat condition and can be emitted by a pressure-sensitive generator. Such a generator placed in the insert or on its surface is sensitive to any stress associated with the bearing of the tire tread on the insert and emits a signal, acoustic, for example, when that stress exceeds a given threshold. The acoustic signal can be easily picked up by a single receiver placed in the passenger space of the vehicle, connected to an indicator capable of warning the occupant of the vehicle of the run-flat condition.

The invention also concerns a second device for detection of bearing of a tire of a vehicle, equipped with a plurality of tire, rim and safety insert assemblies mounted between the rim and the radially inner face of the tire tread, on the corresponding safety insert, each assembly being capable of transmitting a characteristic vibration to the chassis of the vehicle in response to the bearing of one of the tires on the corresponding safety insert as a result of a pressure loss in the tire. This device comprises:

means of detection and treatment of such predetermined characteristic mechanical vibration of the chassis of the vehicle; and means of transmission of an alarm.

This device presents the feature, by comparison with known devices, of making an analysis of the vibrations of the chassis of the vehicle instead of the suspension members.

As in the insert previously described, said device can preferably use direct paths of transmission of vibrations between the wheels and the chassis, in addition to vertical directions. Consequently, said device can be much more selective and sensitive than the existing devices and may have only one sensor rigidly connected to one of the parts of the chassis.

The device according to the invention is particularly well-suited to detection of bearing of a tire on a safety insert according to the invention, but it can also be used with any other insert, with or without vibrating means for alerting the driver to the bearing problem. In such case, it may be necessary to use two or more sensors measuring accelerations instead of only one. Each sensor is then preferably connected to one of the axles of the vehicle.

The means of treating vibrations of the chassis calculate a first characteristic magnitude in at least one given frequency band, they calculate a criterion C corresponding to a given combination of the preceding first characteristic magnitude or magnitudes, they compare that criterion C to a given threshold and they trip an alarm when the result of the comparison follows a given ratio.

Preferably, for each of the axles of the vehicle, the treatment means calculate a first characteristic magnitude in at least a first frequency band specific to the axle of the vehicle and calculate a criterion C corresponding to a weighted value of these first characteristic magnitudes.

The means of treating the vibrations of the chassis can also calculate, in addition, a second characteristic magnitude in a given second frequency band, so that, in said second band, said vibrations are appreciably independent of the bearing of the tire on its safety insert and deduce therefrom a criterion C corresponding to a value normed by that second characteristic magnitude of the first characteristic magnitudes, weighted or not.

According to a preferred embodiment, the treatment means further determine the frequency of rotation of the tire and said first frequency band or bands are narrow frequency bands, each centered on a multiple frequency of said tire rotation frequency. Those first frequency bands preferably range between 10 and 200 Hz.

The treatment centered on multiple frequencies of the tire rotation frequency very appreciably improves the sensitivity of bearing detection.

The characteristic magnitude calculated can be the rms values of the signals.

The invention also concerns a tire designed to equip a tire, wheel and safety insert assembly mounted between the rim and the radially inner face of the tire tread, characterized in that said tire is equipped with means capable of generating a vibrating signal, when said tire comes in contact with a corresponding insert following a pressure loss in said tire. These means can, for example, be a pressure-sensitive generator adhered to the inner surface of the tire.

DESCRIPTION OF THE DRAWINGS

Several embodiments of the invention are now described by means of the attached drawing in which.

DESCRIPTION OF PREFERRED EMBODIMENTS

Figure 1:
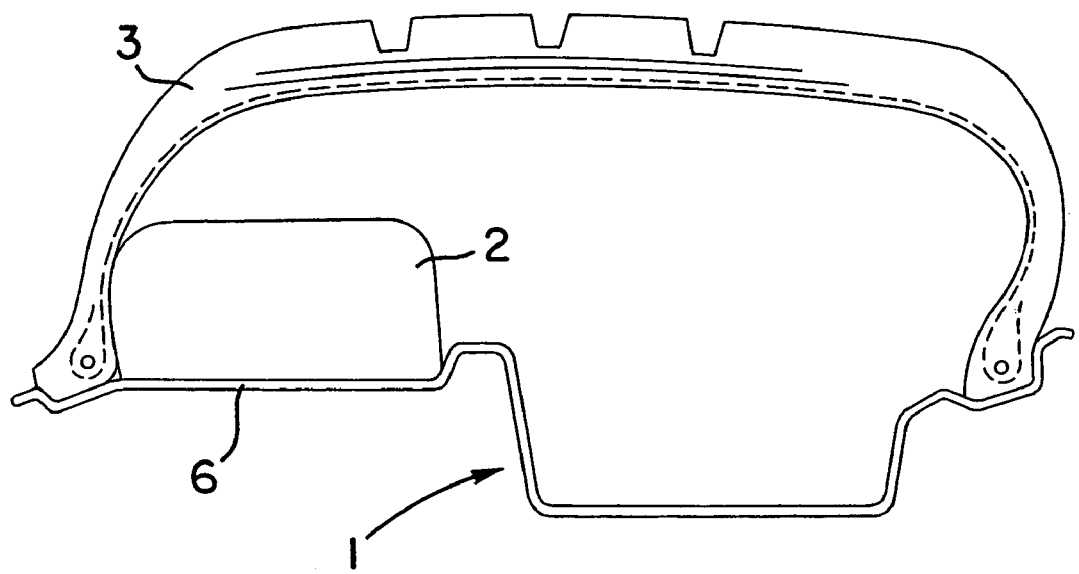
FIG. 1 shows, in meridian section, a tire and rim assembly equipped with a safety insert.

FIG. 1 shows a wheel rim 1 equipped with an annular safety insert 2 resting on the bearing 6 of the rim 1. The particular geometry of said wheel rim 1 is described in French patent application No. 2,713,558. It provides two bead seats of different diameters and is particularly well suited for the easy placement of that safety insert 2. This assembly makes rolling possible in spite of a large pressure drop in the tire 3. In case of such rolling, the inside of the deformed tire rubs on the outer surface of the insert, producing heating which limits the available radius of action; it is therefore important for the driver to be informed as soon as a tire rests on its inset 2:

For this purpose, a safety insert according to the invention is used as insert, containing means for generating transverse vibrating warning signals.

Figure 2:
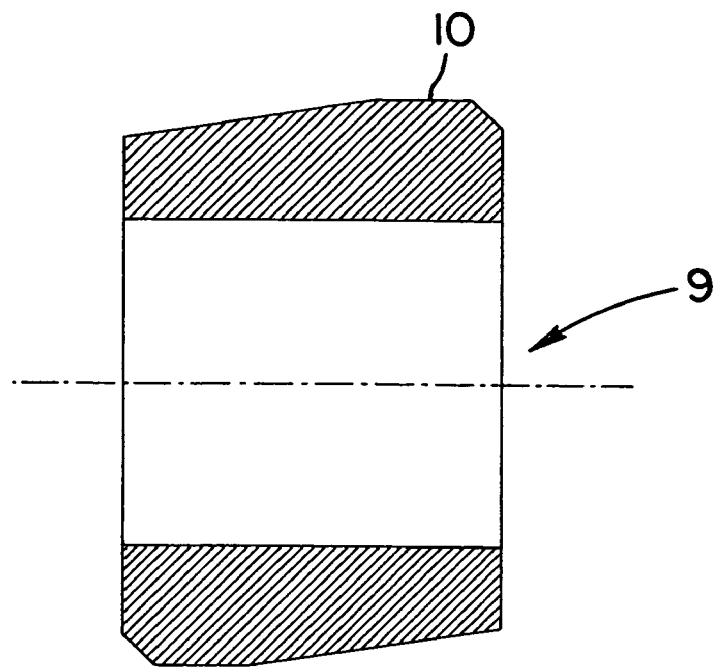
FIG. 2 shows, in meridian section, a first embodiment of a safety insert according to the invention.

A first embodiment of such an insert is shown in FIG. 2. This insert 9 has a bearing surface 10 which is axially shifted according to its azimuth. Consequently, upon a run-flat condition of said surface 10 against that of the crown of the tire, the tire, rim and insert assembly will produce on each turn of the wheel a lateral thrust oscillation that the driver or a detection device will perceive.

Figure 3:
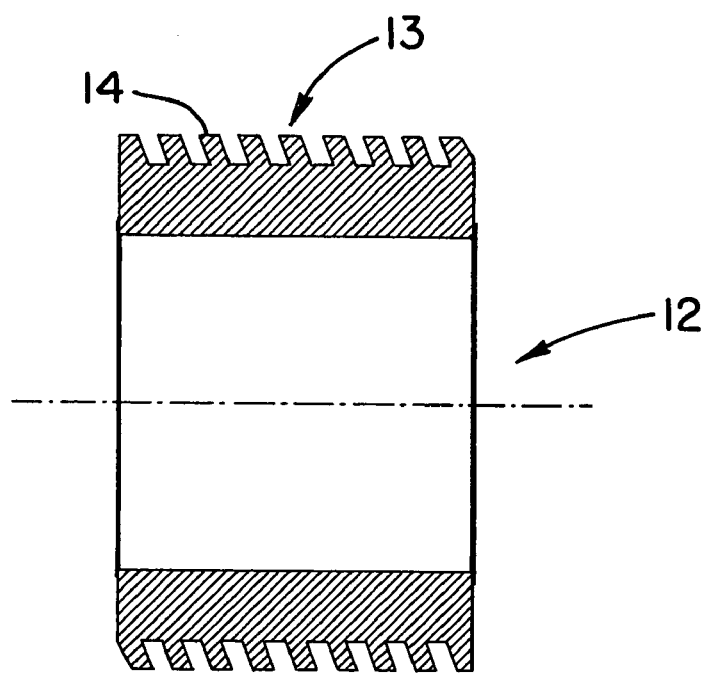
FIG. 3 shows, in meridian section, a second embodiment.

FIG. 3 shows another embodiment. The bearing surface 13 of the insert 12 is formed by incisions 14 inclined relative to a transverse plane of the insert and the inclination of which varies with their azimuth. In the example shown, the inclination is diametrically opposite and the course of the inclination is appreciably sinusoidal. These incisions therefore produce, on loading, transverse stresses of the same frequency as the turn of the wheel, again easily perceptible to the driver of the vehicle, whether directly or not.

It is also possible to use ribs or preferably relatively wide ribs arranged adjacent to incisions of similar or greater radial height. In the latter case, it is advantageous to so design the rigidity and geometry of said incisions and strips that the radius of rolling of the insert remains constant on a run-flat condition.

Figure 4:
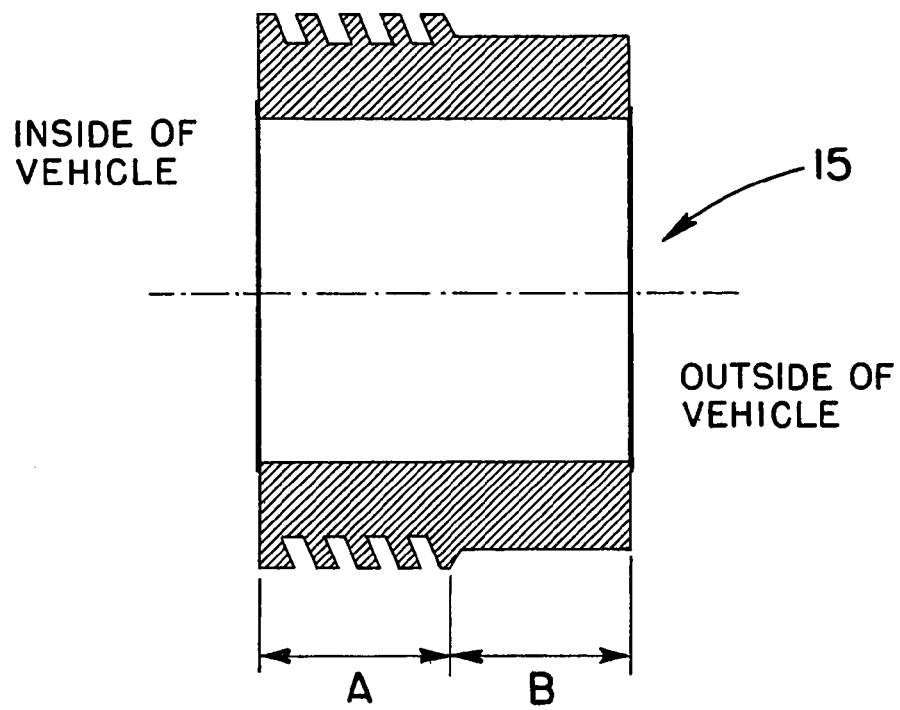
FIG. 4 shows, in meridian section, a third embodiment.

FIG. 4 shows a safety insert 15 containing two axially adjacent zones A and B. Zone B, arranged on the side intended to be placed outward from the vehicle, does not contain means for generating signals oriented parallel to the axis of rotation of the tire and rim assembly. Said zone is thus inactive when zone A, arranged toward the vehicle, contains incisions inclined to generate transverse vibrating signals. Said insert 15 makes it possible to maintain excellent turn performance, for it is then the roughly cylindrical zone B which supports most of the load of bearing of the crown of the tire, by reason of the wide angle of counter-camber taken by the latter. In a straight line, the operation of the insert 15 is similar to that of FIGS. 2 and 3.

Such an insert can also advantageously have a slight conical zone B with its minimum diameter on the outer side of the insert, in order to fit well the counter-camber angle taken by the tire and wheel on turning. There can also be an insert containing two adjacent cylindrical or conical zones on the outside of a central active zone.

Figure 5:
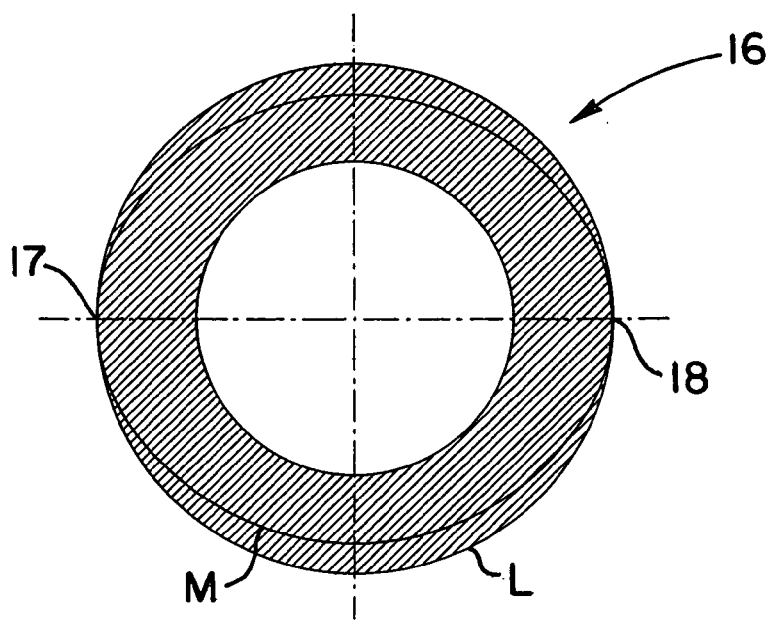
FIG. 5 shows, in cross section, a safety insert with two axially adjacent zones.

FIG. 5 shows an insert 16 containing, in addition to incisions of inclination varying with the azimuth, two radial bumps 17 and 18 created by giving the incisions a height varying with the azimuth, which result in a vertical vibratory excitation. The circle L corresponds to the outside of the insert bearing surface and the oval M corresponds to the casing at the base of the incisions. The incisions in the present example thus have zero height at the two crowns of bumps 17 and 18. It has, in fact, been observed that such an insert 16, coupling generations of transverse and vertical vibrations, appreciably increases the total energy transmitted in the vehicle.

FIG. 6a shows a preferred shape of the signal generated by a safety insert according to the invention. Said signal differs from zero only within a zone limited to approximately ⅓ the circumference of the insert. It comprises a first minimum $F_{Ymin}$ followed by a maximum $F_{Ymax}$ of opposite direction and followed, finally, by a second minimum. The two minima can have the same amplitude ranging between ⅕ and ½ of $F_{Ymax}$.

Figure 6:
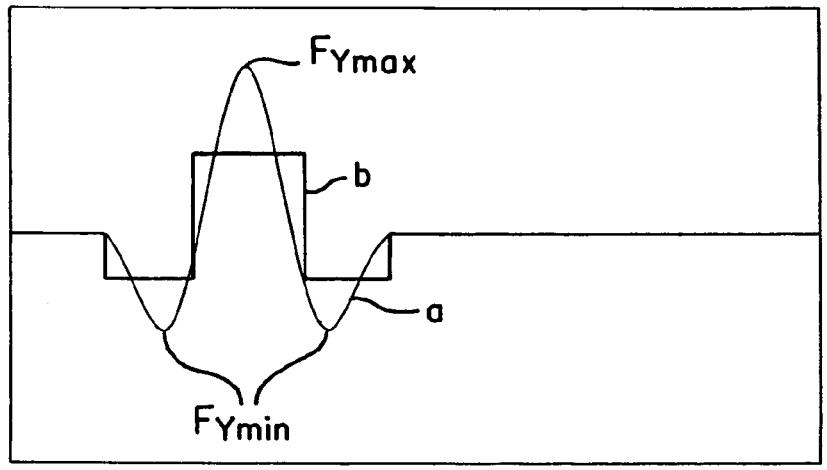
FIG. 6 shows schematically a preferential shape of signals generated by the insert on rolling.

The safety inserts previously described can easily generate signals similar to those of FIG. 6. It is sufficient for the means used to generate the Y signals to vary similarly. In the case of insert 9, the lateral position of the bearing surface 10 can follow a course corresponding to that of a or b of FIG. 6. By reason of the weighting due to the finite length of the area of contact between the tire and the bearing surface of the insert, a variation similar to that of b in FIG. 6 will result in a course of the signal generated close to the shape of curve a. In the case of insert 12 of FIG. 3, it is the orientation of the ribs or incisions which must follow a course corresponding to curves a or b in FIG. 6.

In the usual manner, in order to limit heating of the insert and tire on run-flat condition, a lubricant is introduced in the inner cavity of the tire and, in particular, on the bearing surface of the insert. To improve adherence between the bearing surface of the insert and the crown of the tire, it is advantageous to arrange on the bearing surface incisions of roughly circumferential orientation, which will play the same role as the incisions of the tire sculptures in order to remove water in the area of contact between the tire and the road.

The safety inserts according to the invention can generate signals of great enough intensity to be perceived by the driver of a vehicle. However, to preserve the comfort of the passengers of the vehicle, it is also possible to use these inserts with a bearing detector which will now be described.

Figure 7:
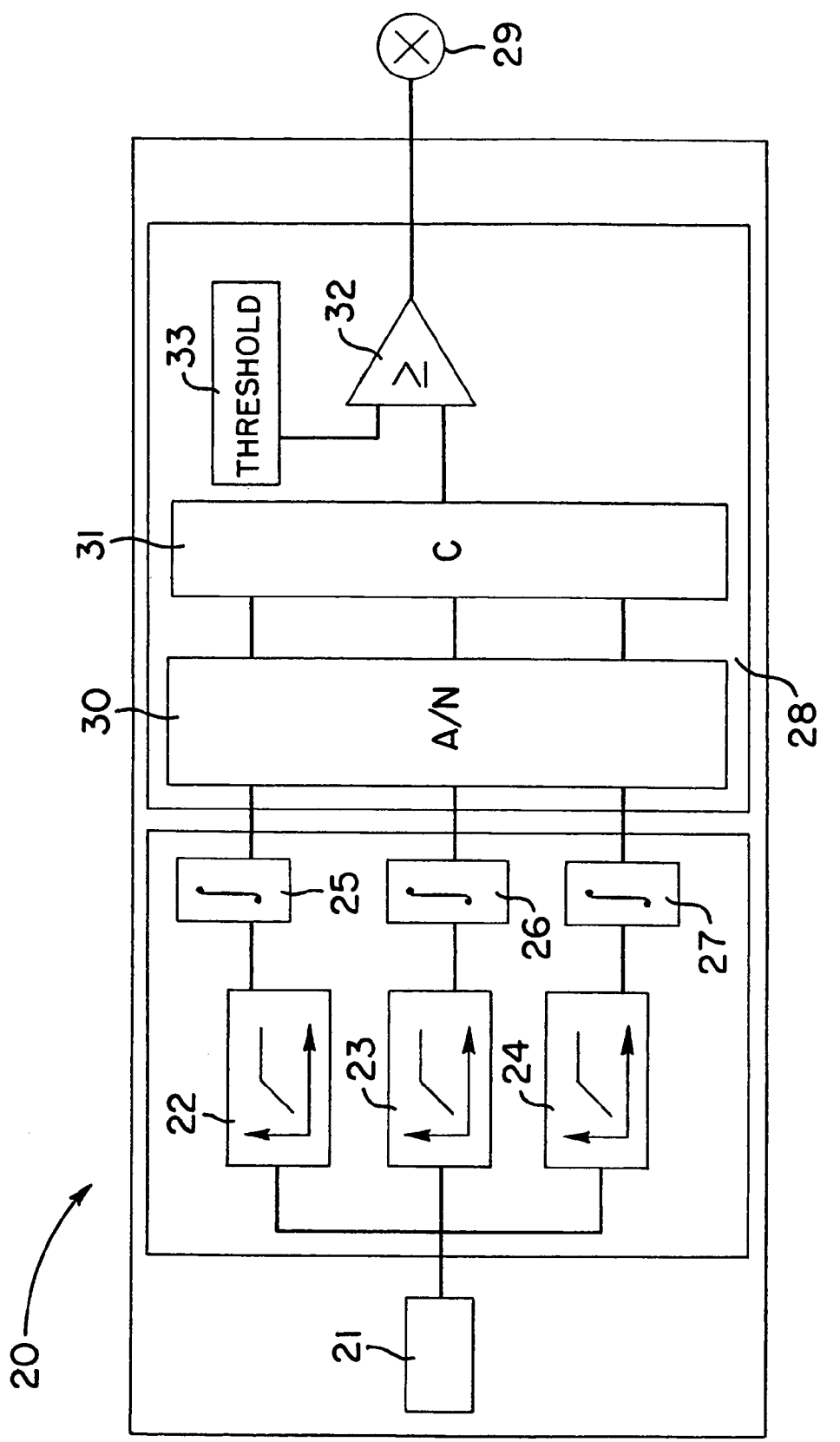
FIG. 7 is a schematic diagram of the detection device according to the invention.

FIG. 7 schematically presents the detector according to the invention, intended to be used with a two-axle passenger car, for example, a Renault Twingo. Said device 20 includes a sensor 21; a series of bandpass filters 22, 23, 24; three analog extractors 25, 26, 27 of the rms value of the signals; a microcontroller 28 and an indicator 29. The assembly is placed in a single box designed to be rigidly connected to one of the parts of the chassis of the vehicle. The sensor 21 is preferably a unidirectional accelerometer so arranged in the vehicle that it measures the accelerations in a plane embracing the longitudinal and transverse axes of the vehicle. The signals are then filtered by a series of bandpass filters placed in parallel. Filter 22 eliminates the signals outside a band A adapted to the rear axle of the vehicle, in the order of 20 to 50 Hz. Filter 23 eliminates the signals outside a band B adapted to the front axle of the vehicle, in the order of 50 to 80 Hz and filter 24 lets pass the signals lying in a band E, in which the signals are appreciably independent of the bearing of a tire on its safety insert, in the order of 100 to 200 Hz or preferably of 100 to 160 Hz. These three frequency bands can, notably, vary with the type of safety insert used as well as with the vehicle chosen.

Extractors 25, 26 and 27 obtain rms values of the signals transmitted respectively by bandpass filters 22, 23 and 24. The microcontroller 28 digitizes the signals in the digital analog converter (A/N) 30. Element 31 of the microcontroller 28 calculates a criterion C; it can notably produce a weighted total of the rms values of the signals of bands A and B and norm that total by the rms value of the signals of band E.

The vibrational energy lying in band E depends on the type of road on which the vehicle runs. The normalization obtained appreciably improves the sensitivity of the detector by reducing the number of false alarms. Said band E can also lie in a very low frequency band, in the order of 3 to 7 Hz, for example.

Criterion C is then compared to a programmable given threshold 33 in the comparator 32 and an alarm is set off by means of the indicator 29 when C is higher than the threshold.

Figure 9:
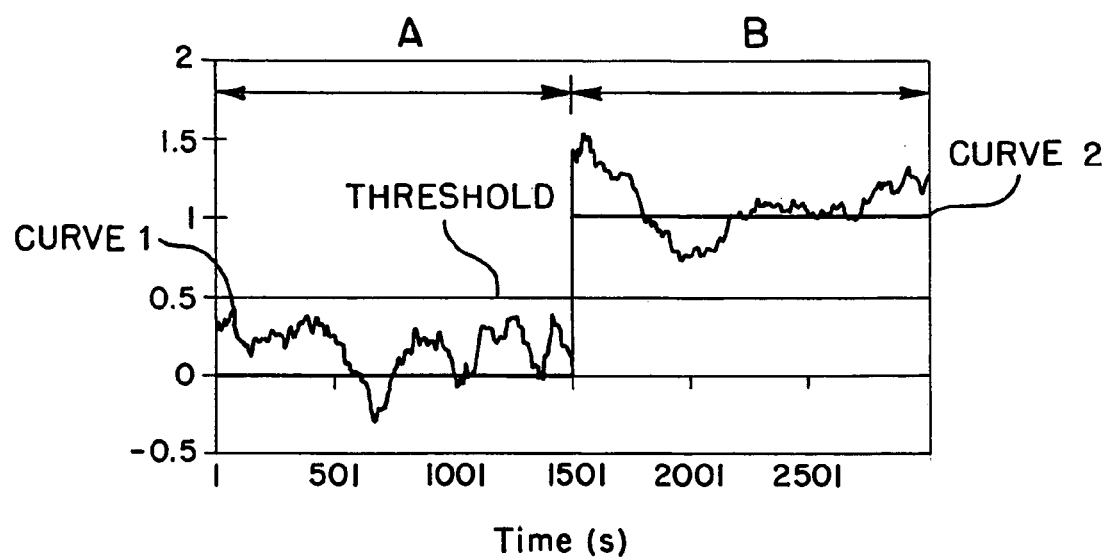
FIG. 9 illustrates an example of evolution with time upon rolling with or without bearing of the resultant magnitude calculated by the microcontroller of the device.

FIG. 9 presents the course of criterion C when the four tires of the Renault Twingo are correctly inflated (zone A) and when one of those tires is deflated, which results in the bearing of that tire on its safety insert (zone B). Curve 1 shows the rough course of C and curve 2 shows the result after comparison with the threshold. Said result is zero when C is below the threshold and is 1 when C is above the threshold.

The indicator transmits an alarm to the driver when the result of comparison is 1. Said indicator can be accompanied by a buzzer.

In the case of a heavy-load vehicle, as many frequency bands can be adopted as there are axles in the vehicle, tractor or trailer. There are, of course, also as many sensors as there are vehicles.

When the speed of the vehicle diminishes and approaches zero, the vibrational energy of the different signals diminishes and becomes more and more sensitive to local disturbances. Consequently, tripping of the alarms can be stopped when the speed of the vehicle is below a given threshold, for example, 7 km/h.

Figure 8:
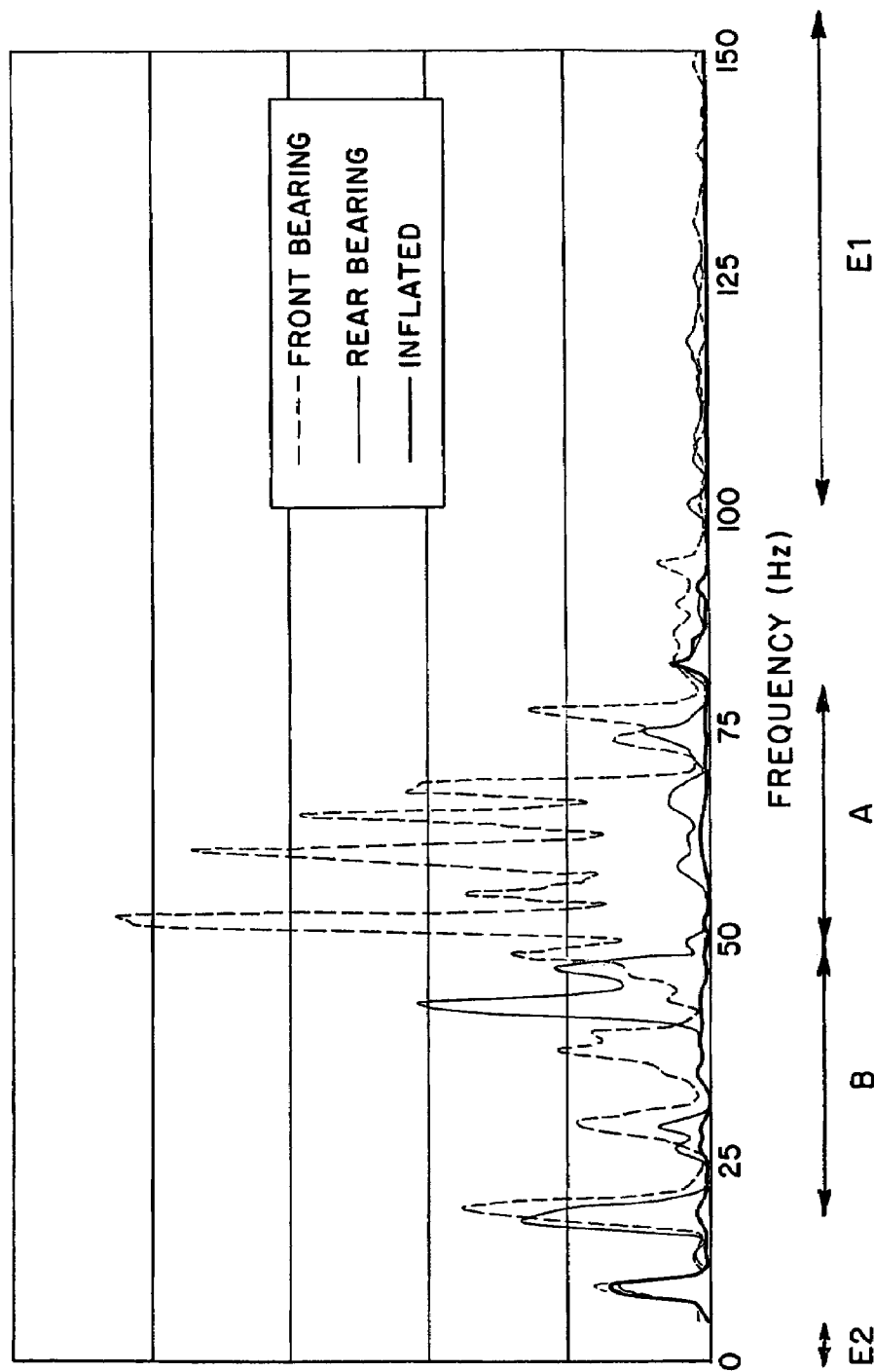
FIG. 8 presents two spectra of measurement of appreciably horizontal accelerations according to frequency with and without bearing registered on an ordinary road.

FIG. 8 shows an example of a spectrum of vibrations measured by the sensor 21 upon rolling with the Renault Twingo. A first curve corresponds to the case in which the four tires are correctly inflated. A peak is usually observed at the low frequencies, toward 9 Hz; that peak corresponds to the first harmonic of the turn of the wheel.

A second curve corresponds to the case in which a tire on the front axle is deflated and bearing on its safety insert. Said curve presents a strong spectral response between 50 and 75 Hz with peaks linked to the different harmonics of the turn of the wheel. In this case, the 50–80 Hz band B has been chosen as characteristic frequency band of that front axle.

The third curve illustrates the case in which one of the tires of the rear axle of the Renault Twingo is bearing on its safety insert. Two notable peaks are observed toward 20 and 40 Hz. The 20–50 Hz band A is then chosen as characteristic band of the rear axle.

It is also observed in FIG. 8 that, in frequencies below 7 Hz, or between 100 and 200 Hz, there is practically no noticeable change in the curves whether or not running flat. Consequently, in order to take into account the vibrational energy due to the type of road on which the vehicle runs, the measurements are normed in the preceding characteristic frequency bands by measurement of the rms value in a band E such as 100–160 Hz or 3–7 Hz. This makes it possible to rely on the quality of the bearing detection. When the speed of the vehicle diminishes, so that the first harmonic of the turn of the wheel becomes around 7 Hz, in order to avoid disturbances, the transmission of alarms is inhibited.

To have a single criterion of bearing detection and taking into account the notable energy differences between the measurements upon bearing of a front or rear tire on its insert, the measurements can be weighted in order to obtain a characteristic magnitude roughly of the same value, regardless of the axle of the tire bearing on its insert. This is what is done for the curve presented in FIG. 9.

Curves 8 and 9 are obtained with a safety insert generating a transverse signal over one-third the circumference of the insert and varying between zero and $F_{Ymax}$. This generated signal has a broader spectrum than that of FIG. 6. The detector used has a single unidirectional sensor rigidly connected to the chassis of the vehicle placed with a transverse orientation.

The signal shape presented in FIG. 6 has the advantage of well delimiting in frequency the signals transmitted to the chassis of the vehicle and of concentrating those signals in mainly a single frequency band. Said band is defined to embrace, whatever the speed of the vehicle beyond a few kilometers per hour, the characteristic frequency bands of each of the axles of the vehicle. This makes it possible to rely on the quality of detection and to limit false alarms. This also makes it possible to use the energy transmitted to best advantage without degrading the comfort of the vehicle. The $F_{Ymax}$ values of those signals can thus be reduced.

According to another embodiment, the means of treatment:
- determine the frequency of rotation of the tires of the vehicle;
- calculate the frequencies of n first harmonics of the frequency of rotation of the tires (turn of the wheel);
- calculate the vibrational energies of the n narrow frequency bands centered on the n first harmonics;
- figure, if necessary, the total of the three maximum energies in order to obtain a criterion C;
- compare that criterion C to a function threshold of speed and unevennesses of the road; and
- trip an alarm if C is higher than that threshold.

The speed information can be obtained from the tachometer of the vehicle; it can also be deduced from the signals registered by determining the frequency position of the first peak (see FIG. 8).

"Narrow band" of frequency is understood to be a band of width below 5 Hz.

As can be seen on the curves of FIG. 8, the frequencies corresponding to the harmonics of the first peak (turn of the wheel) are also spectrum peaks. Consequently, analyzing the harmonics of the turn of the wheel makes it possible to improve very appreciably the detection of bearing of a tire on its safety insert.

To facilitate calculations, they can be limited to a few harmonics, from 5 to 11, for example, from harmonic 2 to harmonic 6 or 12, depending on the vehicles. The corresponding frequencies, for a wide range of speeds of the vehicle, are found in the frequency band where the vibrations of the insert can be transmitted to the chassis of the vehicle by the different suspension elements. Said band usually lies between 10 and 200 Hz.

As it is always possible for one or more peaks to be disturbed by other sources, such as vibrations of the engine, it is useful to analyze these harmonics to calculate the vibrational energies of the narrow bands centered on them and to total, for example, the three maximum energy bands in order to calculate criterion C.

As previously, it is useful to determine the vibrational energy in at least one frequency band, in which the spectrum measured is appreciably independent of bearing, in order to be able to estimate what might be due to the unevennesses of the road traveled. In this method of analysis, said second band should not contain the harmonics of the turn of the wheel.

Criterion C is a function of speed of the vehicle; it can be compared to a function threshold of speed and the vibrational energy level due to the road and, as previously, trip an alarm when that threshold is crossed.

To avoid false alarms, provision is made for two tests of nontripping of the alarm. The first is linked to the speed of the vehicle; it provides for neutralization of the alarm when the speed is below a given threshold, for example, 25 km/h. Determination of the energy due to unevennesses of the road makes it possible to introduce the second test of nontripping of the alarm, when that energy linked to the road exceeds a given value. In this case, that corresponds to rolling over a very bad road and the energy due to the unevennesses of the road is such that it renders bearing detection too haphazard.

The safety inserts according to the invention can be made essentially of very rigid elastomeric material. They can also be made of any other material, such as a loaded or unloaded plastic.

Figure 10A:
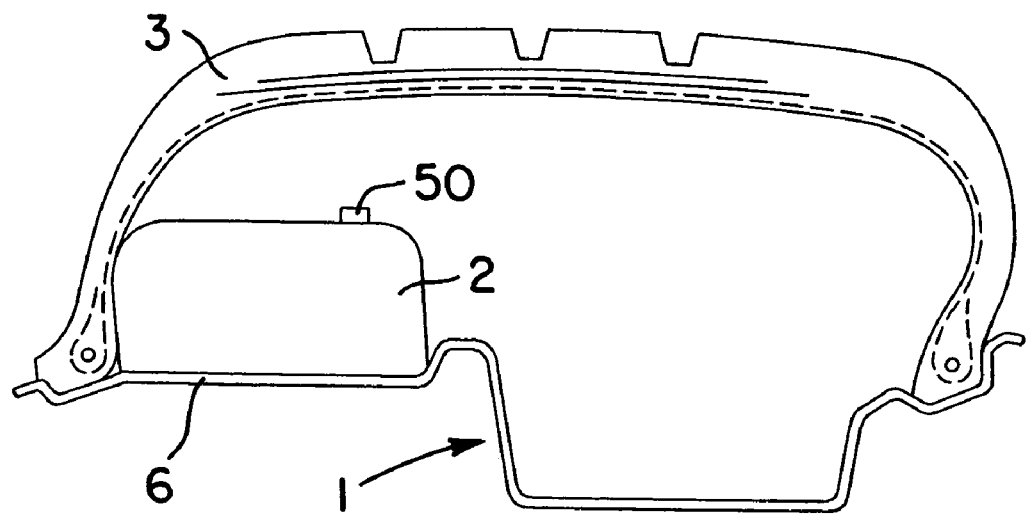
FIGS. 10a and 10b show, in meridian section, two variant tire and rim assemblies equipped with a safety insert.
Figure 10B:
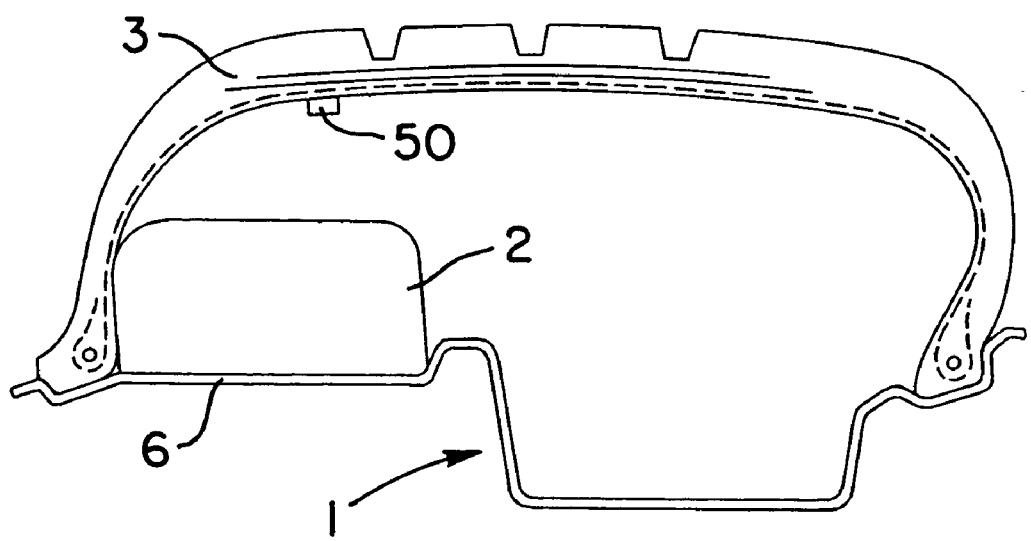

The invention also concerns another device for the detection of bearing of a tire on its safety insert by reason of a pressure loss. Said device uses tire, rim and safety insert assemblies capable of triggering the emission of a vibrating signal when the tire comes in contact with the insert after a pressure loss in the tire. Such a device uses, for example, a generator 50 sensitive to the pressure emitting a predetermined radio signal when the bearing and the inner surface of the tire are in contact. Said generator 50 can be adhered to the inner surface of the tire, as in FIG. 10*b*, or to the outer surface of an insert, as in FIG. 10*a*.

The device comprises such a tire, rim and insert assembly and a single receiver of the signals emitted by the generators 50, as well as an indicator capable of warning the occupant of the vehicle of the bearing condition.

We claim:

1. A safety insert designed to be mounted in an assembly comprising a tire and a rim of a vehicle and radially on the outside of the rim, the insert having a radially outer bearing surface which defines a radial bearing for the crown of the tire when the tire is deflated and means for generating vibrating warning signals on a run-flat condition, wherein the means is configured to generate the vibrating warning signals by generating vibrations oriented in a transverse direction, parallel to an axis of rotation of the tire and rim assembly.

2. A safety insert according to claim 1, in which a height of the bearing surface of the insert varies in the transverse direction, such that a maximum height of the bearing surfaces shifts in the transverse direction according to an azimuth of the bearing.

3. A safety insert according to claim 1, in which the bearing surface of the insert contains straight ribs, the circumferential orientation of which varies with their azimuth.

4. A safety insert according to claim 1, in which the bearing surface of the insert contains elements generating a transverse stress upon their radial compression.

5. A safety insert according to claim 4, in which the elements comprise ribs or incisions whose inclinations relative to a longitudinal plane vary with their azimuth.

6. A safety insert according to claim 4, in which the bearing surface has an appreciably constant rolling radius under bearings.

7. A safety insert according to claim 1, in which the bearing surface presents at least two axially adjacent zones, the zone intended to be placed outward from the vehicle not containing means for generating signals oriented parallel to the axis of rotation of the tire and rim assembly.

8. A safety insert according to claim 1, including means for generating vertical signals.

9. A safety insert according to claim 1, in which the bearing surface contains an active zone of generation of signals, such that said signals present a maximum preceded and followed by a minimum in the opposite direction.

10. A safety insert according to claim 9, in which said active zone lies between ¼ and ½ of the circumference of said insert.

11. A safety insert according to claim 9, in which the absolute value of the minima of the signal generated lies between ¼ and ¾ of the absolute value of the maximum.

12. A safety insert according to claim 1, wherein the bearing surface is inclined in the transverse direction.

13. A safety insert according to claim 12, wherein a transverse position of a peak of the bearing surface varies according to an azimuth of the bearing.

* * * * *